July 14, 1953  R. S. McWATTERS  2,645,173
BEVERAGE BREWING DEVICE
Filed Feb. 23, 1950  3 Sheets-Sheet 3

INVENTOR.
Robert S. McWatters
BY
Alex E. MacRae
Attorney.

Patented July 14, 1953

2,645,173

UNITED STATES PATENT OFFICE 2,645,173

BEVERAGE BREWING DEVICE

Robert Samuel McWatters, Ottawa, Ontario, Canada

Application February 23, 1950, Serial No. 145,810

11 Claims. (Cl. 99—319)

This invention relates to devices for brewing beverages, such as coffee and the like.

It has heretofore been known that, in order to prepare a pleasant and wholesome coffee brew, treatment of the ground coffee with boiling water for a prolonged period of time is not necessary and indeed has a deteriorating effect both as to palatability and wholesomeness. It has also been known that the oils and other soluble constituents of the ground coffee will readily diffuse to a substantial degree in cold water as well as in hot water. However, despite such prior knowledge, practically all coffee makers now on the market are based upon the principle of treating the ground coffee only with boiling water. Moreover, while certain workers in the art have proposed the use of coffee brewing devices wherein means are provided for maintaining the ground coffee free from contact with boiling water, such devices have not achieved commercial success, probably because of their complicated and expensive construction.

An object of the present invention is to provide a beverage brewing device of simple and inexpensive structure and which includes means for initially immersing in a body of water a supply of beverage making material, and means responsive to steam rising from such water for withdrawing the supply of material from the body of water.

Figure 1:
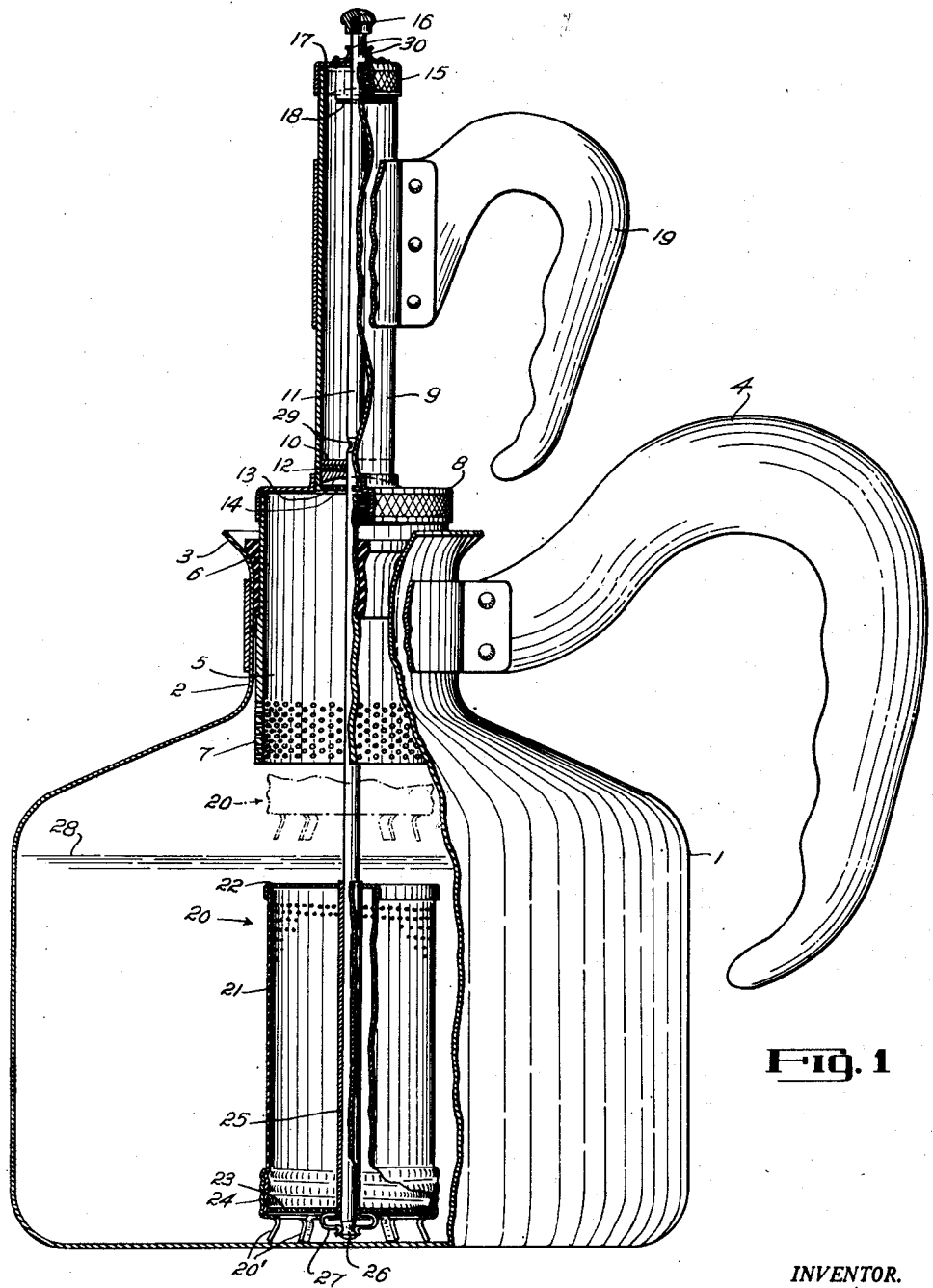
Figure 2:
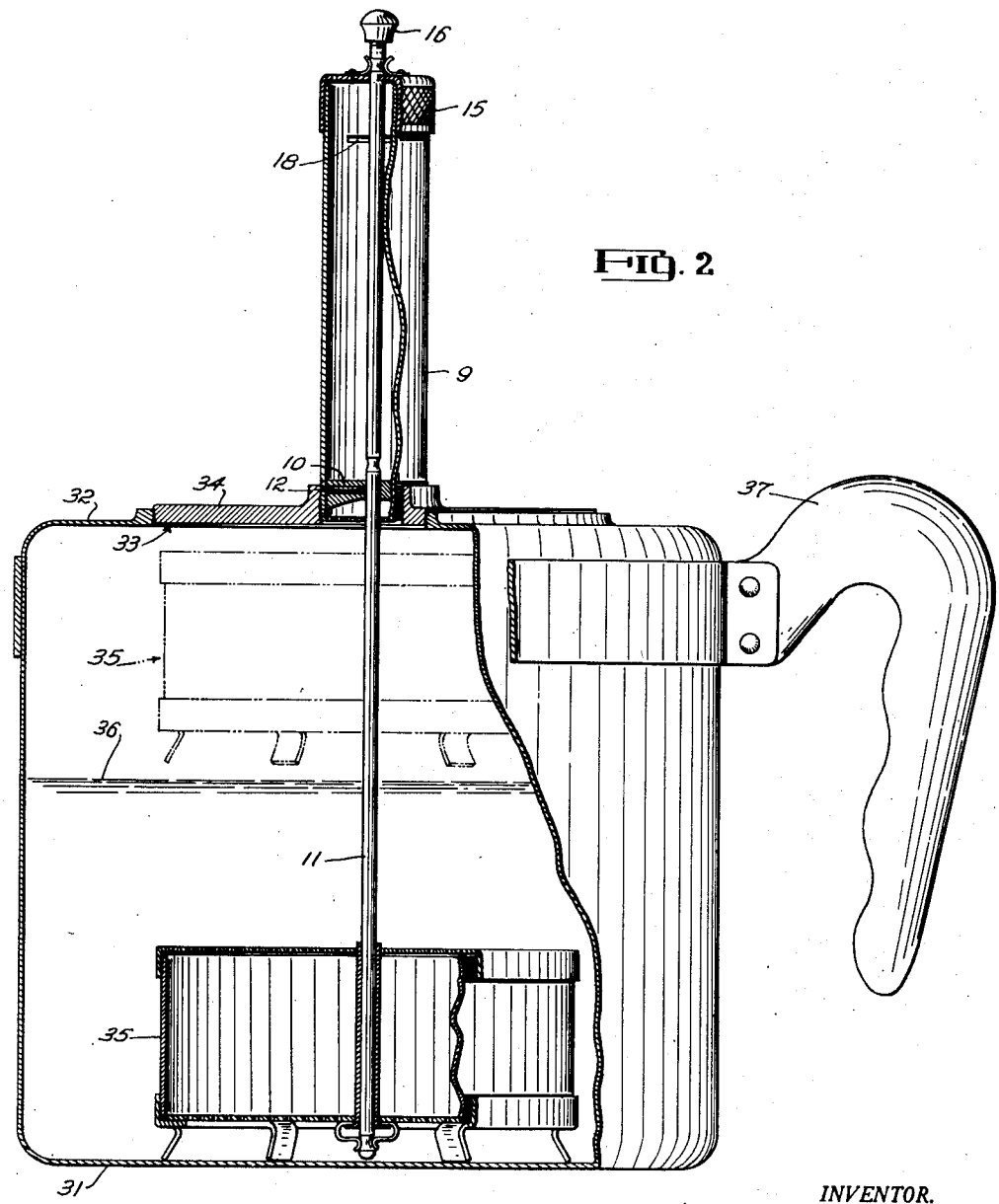
Figures 4, 5:
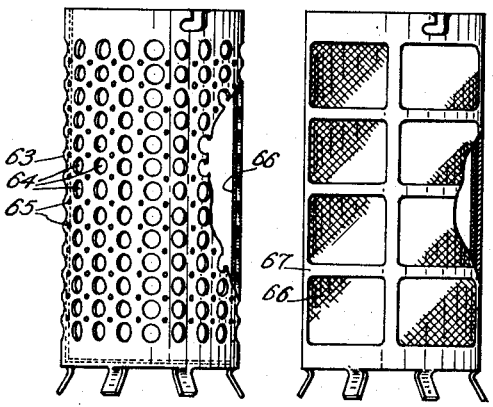
Figure 3:
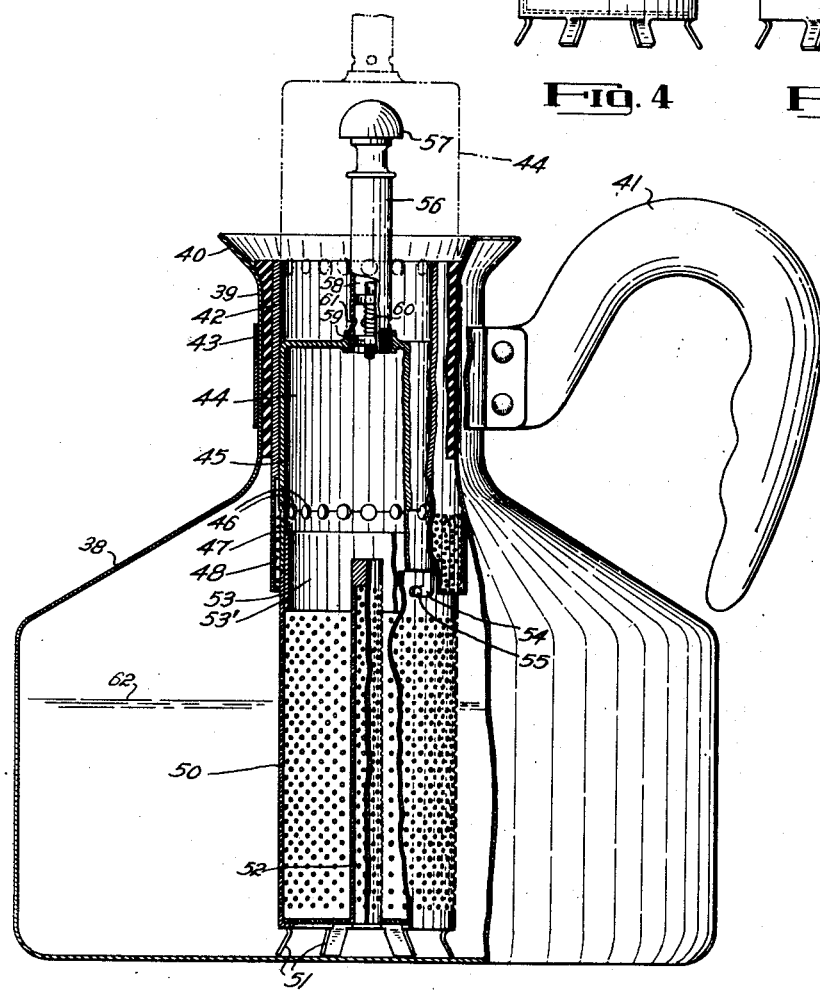

Other objects, details and advantages of the invention will become apparent as this description proceeds with particular reference to the accompanying drawings in which, Figure 1 is an elevation, partly in section, of a brewing device in accordance with the invention, Figure 2 is an elevation, partly in section, of a modified form of device, Figure 3 is an elevation, partly in section, of another modified form of device, and Figures 4 and 5 are elevations of modified forms of containers for beverage making materials.

Referring to Figure 1, 1 is an outer receptacle which may be formed of any suitable material capable of withstanding heat but is preferably formed of heat-resistant transparent material, such as glass. Moreover, while the receptacle may be made in a wide variety of different shapes, it is preferably formed with a restricted neck portion 2 having an outwardly flared lip 3. A handle 4 of usual type is provided. Removably mounted in the neck portion is a cylindrical tubular member 5, the external surface of which is in sealing relation with the internal surface of the neck as by means of a rubber or like sealing ring or band 6. The member 5 extends somewhat above the lip 3 of the receptacle and may have a lower perforated section 7 extending somewhat below the neck portion 2. The lower end of member 5 is open but the upper end is provided with a removable closure cap 8, which may have screw-threaded engagement therewith as shown.

Axially mounted on cap 8 and extending upwardly therefrom is a hollow cylinder 9 of considerably smaller diameter than that of the cap. Preferably, the cylinder is readily removable from cap 8 and for this purpose its lower end may have screw-threaded engagement with the cap, as shown. Mounted for reciprocation in the cylinder is a piston 10 which is adjustably fixed on a piston rod 11 as by means of a set screw 12. The piston may be of plain cylindrical form and may have a concave lower surface 13.

The lower end of cylinder 9 communicates with the interior of member 5 and is preferably provided with a perforated plate 14 through which the piston rod extends and which serves as a guide therefor. The upper end of cylinder 9 is provided with a removable closure cap 15 which, as shown, has screw-threaded engagement with the cylinder. The piston rod extends axially through the cap which also serves as a guide therefor. The upper end of the piston rod above the cap is provided with a knob 16. The cap 15 is provided with a restricted air vent opening 17. Adjacent the upper end of cylinder 9 is a steam outlet opening 18 therein, which as shown, may take the form of a narrow horizontally extending slot. A handle 19 may be fixed to cylinder 9.

On the lower end of piston rod 11 is removably mounted a container 20 for beverage making material such as coffee. The container may comprise a cylindrical tubular body 21, preferably perforated as shown, an upper perforated closure cap 22, a lower perforated closure disc 23, and an annular flanged ring 24 having threaded engagement with the lower end of body 21 to retain the disc 23 in place. The piston rod extends through an axial tube 25 which has its lower end fixed to disc 23 and its upper end located at cap 22. Any suitable means is provided for removably securing the lower end of piston rod 11 to the container and, as shown, may comprise an annular recess 26 in the rod and a cooperating spring clip 27 fixed to disc 23 and engageable with the recess 26. The container 20 is preferably provided with legs 20' which may be struck out of the ring 24, and which support the container in spaced relation to the bottom wall of the receptacle to permit flow of water through the disc 23.

In operation, a supply of ground coffee or the like is placed in container 20, and water of normal cold temperature added to receptacle 1 to a level not substantially higher than that indicated at 28. The coffee container is then immersed in the water, i. e., in the full line position of Figure 1. The receptacle is then placed on a heating surface, such as a stove or the like. It will be appreciated, however, that as soon as the coffee is immersed in the cold water, diffusion of soluble ingredients of the coffee into the water begins to take place and continues throughout the subsequent heating step, which will occupy a number of minutes. As the heating continues, steam begins to form in the space between the water level and top wall of the receptacle but pressure thereof is not appreciable until shortly after the body of water reaches the boiling point. At this point, which is reached substantially immediately after the body of water attains a full boil, the steam pressure forces the piston 10 upwardly carrying with it the piston rod and coffee container 20. As soon as the piston passes the outlet 18, i. e., when it reaches the position shown in dotted lines, it remains substantially stationary due to the escape of steam through outlet 18. The length of the piston stroke is such that the lower end of container 20 will be raised to a point somewhat above the water level in the receptacle, as shown in dotted lines. A satisfactory length of piston stroke has been found to be approximately 3¼ inches. It will be appreciated that, in the raised position of container 20, it is telescopically received within member 5.

Means for releasably locking the piston at the end of its upward stroke may be provided and, as shown, comprises an annular recess 29 in the piston rod 11 and spring clips 30 mounted on cap 15 and engageable with the recess. Such locking means is, however, not essential.

From the foregoing, it will be clear that means have been provided for positive automatic removal of the coffee grounds from the coffee brew substantially immediately after boiling point is reached. Thus, a more uniform, wholesome and palatable brew is provided. Moreover, the device lends itself to the convenient making of small as well as large amounts of coffee. If desired, graduated markings corresponding to various desired amounts of coffee brew may be placed on the receptacle 1 and container 20 for convenience in inserting the required quantities of water and coffee.

After the piston and related parts have completed their upward stroke, the user may, if desired, reciprocate the piston manually by grasping the knob 16 and move the container 20 into and out of the body of liquid several times to rinse the strong coffee oils from the ground coffee and thus strengthen the brew.

On completion of the brew, as described above, the entire assembly, including member 5, cylinder 9 and container 20, may be removed from the receptacle by means of the handle 19, and the coffee brew poured in the usual manner. Alternatively, the member 5 may be left in position in the receptacle by unscrewing the cap 8 and removing it with the other parts. In the latter case, the coffee is poured through the cylindrical member 5, the lower perforated section 7 of which acts to filter the coffee liquid and retain in the receptacle any coffee grounds which may be present in the liquid.

It will be apparent that the assembly is subject to convenient dismantling for cleaning purposes and reassembly.

Member 5, container 20, piston rod 11 and piston 10 are preferably formed of a light weight metal, such as aluminum. Cylinder 9 may be formed of copper, brass or other suitable metal.

Figure 2 illustrates the application of the invention to a large cylindrical liquid vessel 31 having a flat top 32 and a large circular opening 33 in the top. In this modification, the cylinder 9 is mounted directly on the lid or closure 34 for the opening 33. The closure 34 should be removably fixed in the opening 33 as by screw-threaded engagement with the periphery thereof. A coffee container 35 of somewhat larger diameter but of less height than container 20 may be employed. Such a "squat" type of container is desirable in this instance in order that excessive space above the water level 36 will not be required to accommodate the container in such space. Obviously, the diameter of the closure 34 should be slightly larger than that of container 35 to permit removal of the latter from the vessel. A handle 37 may be provided for the vessel and the remaining structural details are similar to those shown in Figure 1.

Figure 3 shows a simplified form of the invention as applied to a receptacle 38, somewhat similar to receptacle 1, and having a restricted neck portion 39 with flared lip 40 and a handle 41. A cylindrical metal liner 42 is mounted in the neck in sealing engagement therewith as by means of an annular rubber band 43. Reciprocally mounted in cylinder 42 is a hollow cup-shaped piston 44 with a depending skirt portion 45. The latter portion is provided adjacent its lower end with a circumferentially disposed row of apertures 46. The lower portion of the outer surface of skirt 45 is inwardly recessed from a line passing approximately through the center of apertures 46 to the lower end of the portion 45, as indicated at 47. The inner surface of the lower end of portion 48 of cylinder 42 may also be recessed as indicated at 49. Such lower end portion 48 may also be apertured, as shown.

A coffee container 50 is removably secured to the lower end of skirt portion 45. Container 50 comprises a cylindrical perforated body provided with legs 51. It may also have an axial perforated tube 52 to assist in circulation of water through the ground coffee in the container. The external diameter of container 50 is not greater than that of recessed section 47 of piston 44. Any suitable means for readily and conveniently attaching and removing container 50 from piston 44 may be provided. As shown, a ring 53 fixed to the interior surface of section 47 has a depending portion 53' which forms a recessed annular shoulder to receive the upper end of container 50. A bayonet slot 54 in such upper end is engageable by a stud 55 on portion 53'.

Handle means for the piston and container assembly comprises an upwardly extending rod 56 having its lower end anchored in the top of the piston 44, and a knob 57 on the top of the rod.

While not essential, it may be desirable to incorporate a steam pressure relief valve in the assembly and, as illustrated, this may comprise a hollow section 58 of rod 56 communicating with the interior of the piston 44 and having a reciprocal valve member 59 mounted therein. A spring 60 normally holds the valve in closed position but when the pressure overcomes the tension of the spring, the valve moves upwardly past ports 61 in the wall of the rod to permit escape of steam through such ports.

Operation of the device is closely similar to that of the previously described modifications. The approximate upper limit of water level in the receptacle is indicated at 62. The recessed section 47 of the piston skirt provides a space between the walls of the piston and cylinder in which steam may enter and flow through apertures 46 into the interior of the piston. As soon as the steam pressure in the receptacle reaches a predetermined degree, which is immediately after the water reaches boiling point, the piston moves to the position shown in dotted lines and normally remains in such position until the receptacle is removed from the heat. It will be observed that, in such position, the upper edges of the unrecessed portions of apertures 46 are just slightly above the upper end of cylinder 42, and container 50 is above water level 62.

Figure 4 illustrates an alternative form of coffee container for use with the device shown in Figure 3. It comprises a cylindrical metal container 63 provided with a multiplicity of large holes or openings 64 and, if desired, a number of small openings 65. The container is adapted to receive a porous fabric or like bag 66 which contains the ground coffee. Use of such a bag prevents the movement of coffee grounds into the brew.

Figure 5 illustrates another alternative form of coffee container wherein a generally cylindrical open metal frame 67 is adapted to support the porous bag 66.

It will be apparent that various changes in structure and operation may be made without departing from the spirit and scope of the invention. For instance, the safety valve, such as indicated at 59, may serve to permit ease of manual oscillation of the piston and container. Moreover, the period during which the coffee container remains submerged in the water may be varied by varying the amount of water placed in the receptacle. Thus, by dropping the water level and increasing the space thereabove, the container will remain in the water for a longer period and may be subjected to a short boiling period, if desired.

What is claimed is:

1. A beverage making device comprising a receptacle having a restricted neck, a tubular member mounted in said neck and having its outer surface in sealing relation therewith, the lower end of said member being open and in communication with the interior of the receptacle, a hollow cylinder mounted on the upper end of said member, the interior of said cylinder communicating with the interior of said member, said upper end of the member being otherwise closed, a piston rod extending axially through said member and cylinder and carrying a piston reciprocally mounted in said cylinder, said cylinder having a steam outlet port adjacent to but spaced from the upper end thereof, and a perforated container for beverage making material removably secured to the lower end of said piston rod.

2. A beverage making device as defined in claim 1, including a removable cap on the upper end of said cylinder, said piston rod extending through the cap, a removable cap on the upper end of said tubular member and on which said cylinder is mounted, and a perforated piston rod guide member on the lower end of the cylinder.

3. A beverage making device as defined in claim 2, including means for locking said piston rod in an upwardly extending position comprising a spring clip mounted on said cylinder cap, the piston rod having an annular recess therein engageable by said clip.

4. A beverage making device as defined in claim 1, said container having supporting legs, an axial tube through which said piston rod is adapted to extend, and spring clip means for frictional engagement with the piston rod to secure the container thereto.

5. A beverage making device comprising a vessel having a top opening, a cover removably fixed in said opening, a hollow upright cylinder having its lower end mounted on said cover and having its interior in communication with the interior of the vessel, a piston in said cylinder, a piston rod fixed to the piston and extending axially through the cylinder and into the vessel, said cylinder having guide means for the piston rod, and a perforated container for beverage making material removably suspended from the lower end of said piston rod.

6. A beverage making device comprising a receptacle having a fixed top wall, said wall having an opening therein of substantially smaller cross-sectional area than that of said receptacle, a closure for the opening, a hollow cylinder fixed to and extending through said closure in upright relation thereto, the interior of the cylinder being in communication with the interior of the receptacle through its lower end, a piston reciprocally mounted in the cylinder, a container for beverage making material removably suspended from the piston and located adjacent the bottom of the receptacle, said receptacle being substantially fully closed whereby steam pressure therein will be communicated to said cylinder to cause upward movement of said piston and container, said cylinder having a steam release opening in its upper end, said piston normally cutting off communication between said opening and the interior of the receptacle.

7. A beverage making device comprising a receptacle having fixed side and top walls, said top wall having an opening therein of substantially smaller cross-sectional area than that of said receptacle, a hollow cylinder disposed within said opening and carried by said top wall, said cylinder extending upwardly from and in upright relation to said top wall, the interior of the cylinder being in communication with the interior of the receptacle through its lower end, a piston reciprocally mounted in the cylinder, a container for beverage making material removably suspended from the piston and located adjacent the bottom of the receptacle, said receptacle being substantially fully closed whereby steam pressure therein will be communicated to said cylinder to cause upward movement of said piston and container, said cylinder having a steam release opening in its upper end, said piston normally cutting off communication between said opening and the interior of the receptacle.

8. A beverage making device comprising a receptacle having fixed side and top walls, said top wall having an opening therein of substantially smaller cross-sectional area than that of said receptacle, a hollow cylinder disposed in axial alignment with said opening and carried by said top wall, said cylinder extending upwardly from and in upright relation to said top wall, the interior of the cylinder being in communication with the interior of the receptacle through its lower end, a piston reciprocally mounted in the cylinder, and a container for beverage making material carried by the piston, said receptacle being substantially fully closed whereby steam pressure therein will be communicated to said cylinder to cause an upward stroke of said piston and container, one of said piston and cylinder having a steam release vent therein, the other of said piston and cylinder normally cutting off communication between said vent and the interior of the receptacle, communication between said vent and the interior of the receptacle being established by upward movement of the piston to determine the extent of said stroke.

9. A beverage making device comprising a receptacle having a top wall and restricted cylindrical neck extending upwardly therefrom, a hollow cylinder carried by said top wall in axial alignment with said neck, said cylinder extending upwardly from and in upright relation to said top wall, a piston reciprocally mounted in the cylinder, the interior of the cylinder being in communication with the interior of the receptacle through its lower end, and a container for beverage making material carried by the piston, said receptacle being substantially fully closed whereby steam pressure therein will cause an upward stroke of said piston and container, said cylinder having a steam release opening in its upper end, said piston normally cutting off communication between said opening and the interior of the receptacle.

10. A beverage making device comprising a receptacle having a top wall and a restricted cylindrical neck extending upwardly therefrom, a hollow cylinder mounted in the neck and in sealing engagement therewith, an inverted cup-shaped piston having integral top and side walls reciprocally mounted in the cylinder, the interior of the piston being in communication with the interior of the receptacle through its lower end, and a perforated container for beverage making material removably suspended from the lower end of the piston, said receptacle being substantially fully closed whereby steam pressure therein will cause an upward stroke of said piston and container, said piston having steam release vents in its side wall.

11. A beverage making device comprising a receptacle having a top wall and a restricted cylindrical neck, extending upwardly therefrom, a hollow cylinder mounted in the neck and in sealing engagement therewith, a piston reciprocally mounted in the cylinder, and a container for beverage making material carried by the piston, said piston having a closed top wall and a depending cylindrical skirt portion engaging the wall of said cylinder, the interior of said piston being in communication with the interior of the receptacle through its lower end, said skirt portion having a series of apertures therein constituting steam release vents, the outer surface of the skirt portion being recessed from said apertures to the lower end thereof to provide a passageway between the adjacent wall surfaces of said skirt portion and cylinder wall and leading from the receptacle to the interior of the piston, said receptacle being substantially fully closed whereby steam pressure therein will be communicated to the interior of said cylinder and piston to cause an upward stroke of said piston and container.

ROBERT SAMUEL McWATTERS.

References Cited in the file of this patent

UNITED STATES PATENTS

| Number | Name | Date |
|---|---|---|
| 529,349 | Adams | Nov. 20, 1894 |
| 1,018,684 | Smith | Feb. 27, 1912 |
| 1,053,735 | Lefevre | Feb. 18, 1913 |
| 1,211,614 | Morales | Jan. 9, 1917 |
| 2,065,149 | Newman | Dec. 22, 1936 |
| 2,177,166 | Bemis | Oct. 24, 1939 |
| 2,181,246 | McNeil | Nov. 28, 1939 |
| 2,209,831 | Schurig | July 30, 1940 |
| 2,234,741 | Schurig | Mar. 11, 1941 |

FOREIGN PATENTS

| Number | Country | Date |
|---|---|---|
| 3,500 | Great Britain | 1912 |
| 569,372 | Germany | Feb. 1, 1933 |